(12) United States Patent
Carr et al.

(10) Patent No.: US 8,007,609 B2
(45) Date of Patent: Aug. 30, 2011

(54) PARALLEL PLATE ARRANGEMENT AND METHOD OF FORMATION

(75) Inventors: Dustin Wade Carr, Albuquerque, NM (US); Gregory Robert Bogart, Corrales, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 935 days.

(21) Appl. No.: 11/932,491

(22) Filed: Oct. 31, 2007

(65) Prior Publication Data

US 2009/0109445 A1 Apr. 30, 2009

(51) Int. Cl.
*B32B 37/00* (2006.01)
(52) U.S. Cl. .................... 156/60; 356/506; 356/519
(58) Field of Classification Search .......... 156/60, 156/145; 356/506, 519
See application file for complete search history.

(56) References Cited

U.S. PATENT DOCUMENTS

| | | | |
|---|---|---|---|
| 4,640,584 A * | 2/1987 | Tsubakimoto et al. ....... 349/153 |
| 4,983,824 A | 1/1991 | Saaski et al. | |
| 5,128,537 A | 7/1992 | Halg | |
| 5,150,236 A * | 9/1992 | Patel .................. 349/198 |
| 5,426,532 A * | 6/1995 | Costich ................ 359/359 |
| 5,589,689 A | 12/1996 | Koskinen | |
| 5,831,262 A | 11/1998 | Greywall et al. | |
| 5,832,157 A | 11/1998 | Berthold et al. | |
| 5,909,280 A | 6/1999 | Zavracky | |
| 5,986,759 A | 11/1999 | DeCain et al. | |
| 6,163,380 A | 12/2000 | Hays | |
| 6,321,010 B1 | 11/2001 | Walker et al. | |
| 6,483,619 B1 | 11/2002 | Greywall | |
| 6,567,572 B2 | 5/2003 | Degertekin et al. | |
| 6,757,046 B2 * | 6/2004 | Noto et al. ............. 349/198 |
| 6,812,993 B2 * | 11/2004 | Noto et al. ............. 349/198 |
| 7,551,295 B2 * | 6/2009 | Carr et al. ............. 356/506 |
| 2002/0154268 A1 * | 10/2002 | Noto et al. ............. 349/198 |
| 2003/0038949 A1 | 2/2003 | Degertekin et al. | |
| 2004/0099799 A1 | 5/2004 | Shinzou | |
| 2004/0130728 A1 | 7/2004 | Degertekin et al. | |
| 2005/0018541 A1 * | 1/2005 | Johansen et al. ......... 367/149 |
| 2005/0105098 A1 | 5/2005 | Johansen et al. | |
| 2005/0231729 A1 | 10/2005 | Lopushansky et al. | |

FOREIGN PATENT DOCUMENTS

GB 1 234 659 A 8/1971

OTHER PUBLICATIONS

Sagberg, et al., Optical Microphone Based on a Modulated Diffractive Lens, IEEE Photonics Technology Letters, vol. 15, No. 10, Oct. 2003, pp. 1431-1433.

* cited by examiner

*Primary Examiner* — Jeff H Aftergut
(74) *Attorney, Agent, or Firm* — DeMont & Breyer, LLC

(57) ABSTRACT

A method for forming a structure comprising multiple parallel surfaces having a precise separation is disclosed. Precise separation and parallelism of the surfaces is achieved through the use of an adhesive mixture that comprises a plurality of spacers having a dimension substantially equal to the desired separation.

13 Claims, 6 Drawing Sheets

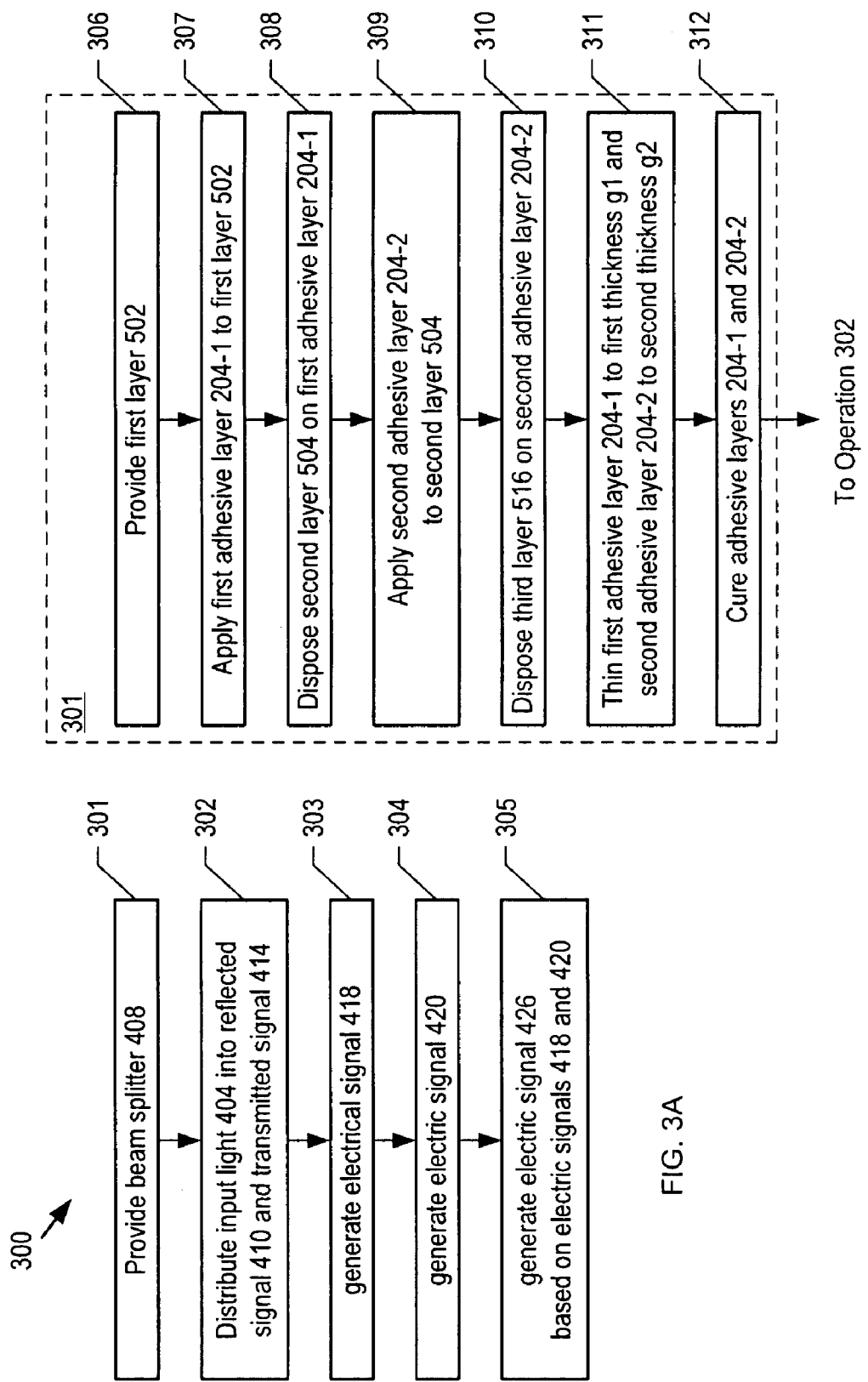

PARALLEL PLATE ARRANGEMENT AND METHOD OF FORMATION

CROSS REFERENCE TO RELATED APPLICATIONS

The underlying concepts, but not necessarily the language, of the following cases are incorporated by reference:
(1) U.S. patent application Ser. No. 11/366,730, filed Mar. 2, 2006;
(2) U.S. patent application Ser. No. 11/927,234 filed Oct. 29, 2007; and
(3) U.S. Provisional Patent Application Ser. No. 60/984, 307, filed on even date herewith.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to displacement sensors in general, and, more particularly, to optical displacement sensors.

BACKGROUND OF THE INVENTION

Many structures require two or more plates that are held parallel to one another with a precise separation between them. Examples include liquid crystal displays, plasma displays, and optically resonant cavities, such as a Fabry-Perot interferometer or Fabry-Perot etalon. An optically resonant cavity is a well-known structure that is defined by two partially reflective parallel surfaces that are separated by a precise distance. This distance is referred to as the cavity length. For light of a particular wavelength, the reflectivity and transmissivity of the optically resonant cavity are functions of the cavity length. A Fabry-Perot etalon has a fixed cavity length, while a Fabry-Perot interferometer has a cavity length that can vary.

A Fabry-Perot interferometer is used as the basis of many optical displacement sensors, wherein its cavity length varies in response to an environmental stimulus, such as acceleration, vibration, pressure, temperature, sound, etc. In some of these sensors, one of the surfaces of the optically resonant cavity is a surface of a membrane that moves in response to the environmental stimulus. When the movable membrane moves in response to the environmental stimulus, the reflectivity and transmissivity of the Fabry-Perot interferometer changes. Photodetectors detect the light reflected and/or transmitted by the Fabry-Perot interferometer and generate electrical signal(s) based on the intensity of the detected light. An electrical signal based on the environmental stimulus is thereby generated.

The optical performance of a Fabry-Perot interferometer-based sensor can be highly dependent upon the initial separation (i.e., initial cavity length) and parallelism of the two surfaces that define the optically resonant cavity. The alignment of these surfaces during fabrication can represent one of the dominant factors in the cost of producing such a device.

One conventional fabrication method relies on the use of support structure that has multi-axis alignment capability. This support structure aligns and holds the multiple surfaces while adhesives are applied and cured to permanently fix them in their relative positions. Unfortunately, active alignment of the surfaces can be a time-consuming process. In addition, trapped air bubbles and internal stresses in the adhesives can lead to movement of the surfaces during and/or after the adhesives are cured.

Another conventional fabrication method relies on the monolithic integration of the surfaces. This typically entails the use of integrated circuit processing equipment in a semiconductor fabrication facility. Although such structures can exhibit exceptional alignment and parallelism, the costs associated with such equipment and facilities can be prohibitive.

Another conventional approach relies on forming alignment features, such as Vee grooves and trapezoidal holes, in each of the surfaces to be aligned. These alignment features are used to trap precision spacers, such as glass spheres or optical fibers, which determine the separation of the surfaces. Unfortunately, this approach has several drawbacks. First, the spacers can be very difficult to handle and insert into the alignment features. Second, the spacers must typically be fixed in the alignment features prior to assembling the multiple surfaces. As a result, minute volumes of an adhesive must be dispensed at each spacer location. Once the spacers are in place with the adhesive, a partial cure of the adhesive is performed to keep the spacers in place during the rest of the assembly process. Since the spacers are usually quite light, the adhesive tends to displace the spacers, at least slightly, from their respective alignment features. This results positional error. In addition, the need to form alignment features as well as the need to add an additional adhesive step increases the overall cost of this fabrication method.

SUMMARY OF THE INVENTION

The present invention enables parallel plate structures having precise separation without some of the costs and disadvantages for doing so in the prior art. Parallel plate structures in accordance with the present invention include optically resonant cavities such as etalons and interferometers. For example, embodiments of the present invention are particularly well-suited for use in optical displacement sensors such as microphones, high-sensitivity pressure sensors, vibration sensors, and accelerometers.

Embodiments of the present invention, like the prior art, use spacers having a precise dimension to determine the spacing between surfaces of two layers. Unlike the prior art, however, some embodiments of the present invention embed such spacers within an uncured adhesive to form a mixture that can be easily and controllably applied. This mixture is disposed between the two layers and thinned so that the two layers are separated by a single layer of the spacers. As a result, the separation between the two layers is made substantially equal to the precise dimension of the spacers.

Some embodiments of the present invention comprise an optically resonant cavity. In some embodiments, one of the surfaces that define the optically resonant cavity is a surface of a membrane that is physically adapted to move in response to an environmental stimulus.

Some embodiments of the present invention comprise a pair of optically resonant cavities that are mechanically and optically coupled. One surface of each of the optically resonant cavities is a surface of a membrane that is physically adapted to move in response to an environmental stimulus. The membrane interposes the other surface of each of the optically resonant cavities so that the cavity lengths of the two cavities are mechanically coupled.

Some embodiments of the present invention comprise an array of optically resonant cavities. In some embodiments, each cavity in the array is physically adapted to respond to the same environmental stimulus. In some embodiments, at least two cavities in the array are physically adapted to respond to different environmental stimuli. In some embodiments, each cavity in the array is optically resonant for the same wavelength of light. In some embodiments, cavities in the array are optically resonant for different wavelengths of light.

An embodiment of the present invention comprises a method comprising: providing a first layer comprising a first surface; providing an adhesive mixture, wherein the adhesive mixture comprises an adhesive in an uncured state and a plurality of spacers, and wherein each of the plurality of spacers is characterized by a dimension that is substantially equal to a first thickness; applying the adhesive mixture to the first layer; and curing the adhesive.

BRIEF DESCRIPTION OF THE DRAWINGS

FIG. 3A depicts a method for forming an optical displacement sensor in accordance with the illustrative embodiment of the present invention.

FIG. 3B depicts sub-operations suitable for forming a beam splitter as part of optical displacement sensor 400 in accordance with the illustrative embodiment of the present invention.

DETAILED DESCRIPTION

Figure 1:
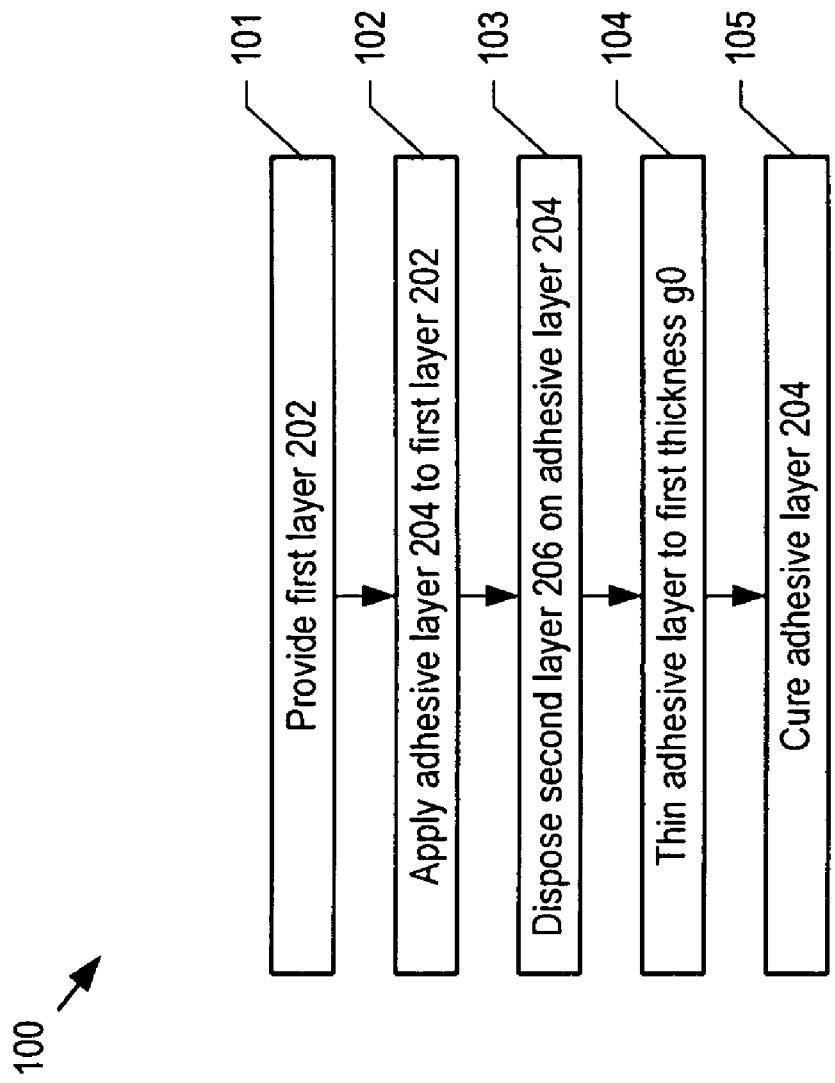
FIG. 1 depicts a method for forming a parallel-layer structure in accordance with an illustrative embodiment of the present invention.

FIG. 1 depicts a method for forming a parallel-layer structure in accordance with an illustrative embodiment of the present invention. Method 100 is described herein with additional reference to FIGS. 2A and 2B.

Figure 2B:
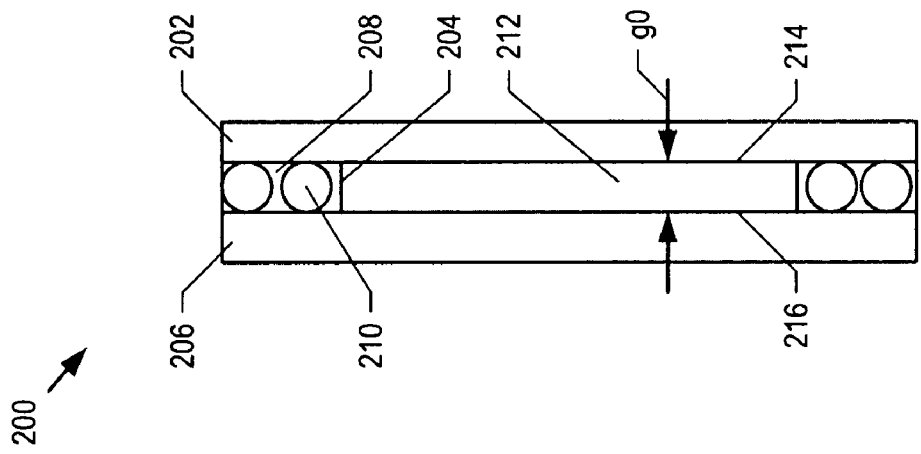
FIG. 2B depicts a cross-sectional diagram of details of a parallel-layer structure, after a thinning operation, in accordance with the illustrative embodiment of the present invention.
Figure 2A:
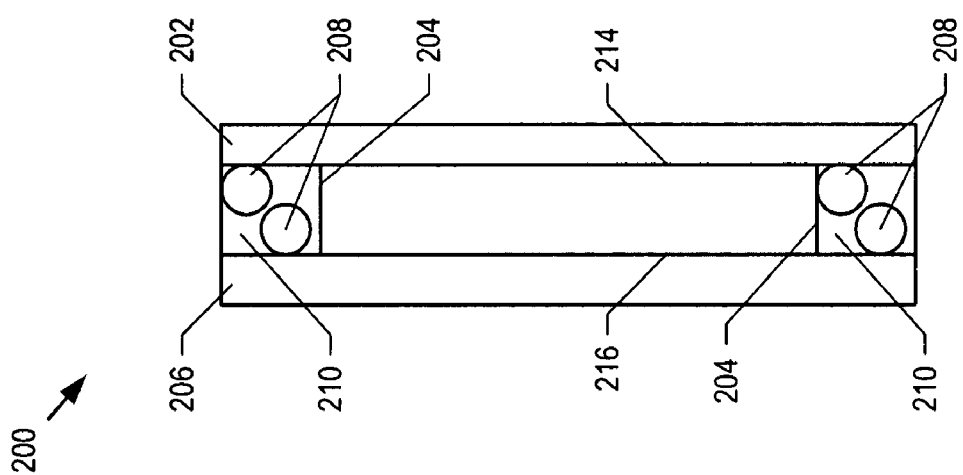
FIG. 2A depicts a cross-sectional diagram of details of a parallel-layer structure, prior to a thinning operation, in accordance with the illustrative embodiment of the present invention.

FIGS. 2A and 2B depict cross-sectional diagrams of details of a parallel-layer structure, prior to and after a thinning operation, respectively, in accordance with the illustrative embodiment of the present invention. Structure 200 comprises first layer 202, adhesive layer 204, and second layer 206.

Referring now to FIGS. 1 and 2A, method 100 begins with operation 101, wherein first layer 202 is provided. First layer 202 is a layer of polymer material having a thickness within the range of approximately 15 microns to approximately 5000 microns. In some embodiments, layer first layer 202 has a thickness that is substantially equal to 100 microns. Materials suitable for use in first layer 202 include, without limitation, Mylar, polyesters, Kapton, polyimides, nylons, Rayon, and polyethylenes, acrylics, polycarbonates, polypropylenes, vellums, or other cellulose based membranes. In some embodiments, first layer 202 comprises a material other than a polymer. Non-polymeric materials suitable for use in first layer 202 include metals, ceramics, semiconductors, glasses, dielectrics, and the like. In some embodiments, first layer 202 is a layer of material that is disposed on a substrate.

At operation 102, adhesive layer 204 is applied to the first layer 202. Adhesive layer 204 is a mixture of adhesive 208, in an uncured state, and spacers 210. Adhesive layer 204 is applied only to the outer portions of first layer 202 so that a cavity is formed after subsequent operation 103.

Adhesive 208 is a liquid epoxy that cures at room temperature. In some embodiments, adhesive 208 comprises an adhesive other than a liquid epoxy that is curable at room temperature. Adhesives suitable for use as adhesive 208 include, without limitation, UV-curable epoxies, thermo-set epoxies, and the like. The viscosity of adhesive 208 is within a range that enables it to mix with spacers 210. In some embodiments, adhesive 208 is a gel in its uncured state.

Spacers 210 are spheres of a substantially incompressible material that have a diameter within the range of approximately 5 microns to approximately 5000 microns. In some embodiments, spacers 210 have a diameter substantially equal to 150 microns. Materials suitable for use in spacers 210 include, without limitation, glasses, ceramics, metals, plastics, and the like. It will be apparent to one of ordinary skill in the art that, in practice, some slight variation in the diameter of spacer 210 is expected. Given sufficient bonding area and a sufficient number of spacers, however, deleterious effects on the parallelism of first layer 202 and second layer 206 can be made tolerable. In some embodiments, spacers 210 are spheres of a substantially resilient material. Such resilient spacers can be compressed, if desired, to afford the ability to tune the size of gap g0. Resilient materials suitable for use in spacers 210 include, without limitation, rubber, and plastics, such as styrene, butadiene, divinylbenzene, vinyl, Teflon, and the like.

In some embodiments, spacers 210 are cylinders that have a diameter within the range of approximately 5 microns to approximately 5000 microns. In some embodiments, spacers 210 are a mixture of spacers of suitable shapes that include spacers having a dimension that is substantially equal to a desired gap g0.

At operation 103, second layer 206 is disposed on adhesive layer 204. Second layer 206 is analogous to first layer 202 in its thickness and suitable materials. After operation 103, surfaces 214 and 216 are parallel only to the extent that adhesive 208 is applied uniformly around the perimeter of first layer 202.

Referring now to FIGS. 1 and 2B, at operation 104, pressure is applied to first layer 202 and second layer 206 to compress adhesive layer 204 to a thickness that is substantially equal to the diameter of spacers 210. The thickness of adhesive layer 204 after operation 104 is substantially equal to the diameter of spacers 210. The diameter of spacers 210, therefore, determines the size of gap g0 of cavity 212. It should be noted that the parallelism of surfaces 214 and 216 is dependent upon the uniformity of the diameters of spacers 210 and the extent to which adhesive layer 204 is thinned to the diameter of the spacers.

In some embodiments, adhesive layer 204 is applied to first layer 202 as a substantially solid preform of adhesive that contains spacers 210. After operation 103, energy, such as heat, is applied to the epoxy to enable it to soften (or melt) and adhere to first layer 202 and second layer 206. Operation 104, therefore, would occur while adhesive layer 204 was in its softened (or melted) state. In such embodiments, the preform may be formed by the application of a mixture of an adhesive and spacers in a mold that provides the preform with its desired shape. It will be clear to those of ordinary skill in the art, after reading this specification, how to make and use adhesive preforms that comprise spacers 210.

At operation 105, adhesive layer 204 is cured to harden adhesive 208 and thereby physically constrain spacers 210 and fix gap g0.

FIG. 3A depicts a method for forming an optical displacement sensor in accordance with the illustrative embodiment of the present invention. Method 300 is described herein with additional reference to FIG. 4.

Figure 4:
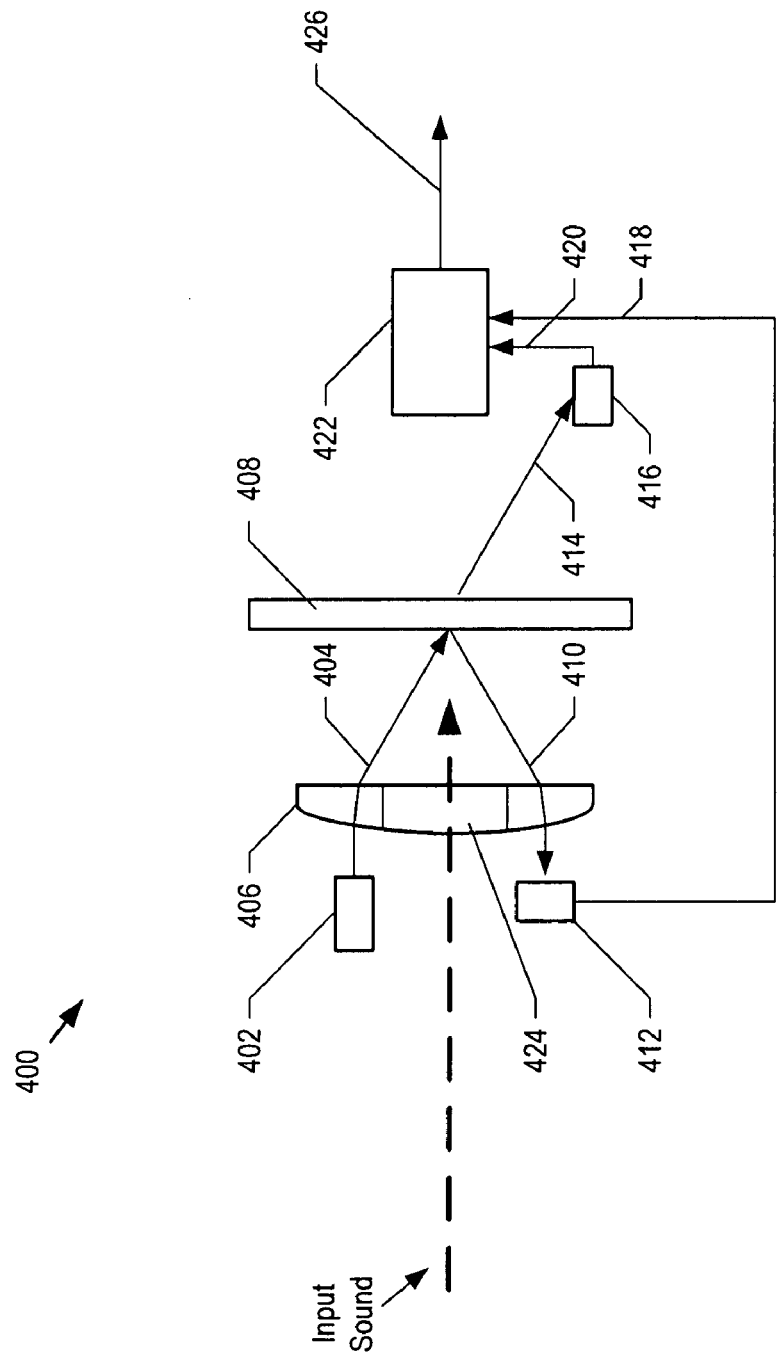
FIG. 4 depicts details of an optical displacement sensor in accordance with the illustrative embodiment of the present invention.

FIG. 4 depicts details of an optical displacement sensor in accordance with the illustrative embodiment of the present invention.

Method 300 begins at operation 301, wherein beam splitter 408 is provided. The sub-operations suitable for the formation of beam splitter 408 are described below and with respect to FIGS. 3B and 5. Beam splitter 408 is an optical element that receives input light 404 and distributes it into reflected signal 410 and transmitted signal 414 based on an environmental stimulus—specifically input sound. The operation of beam splitter 408 is described in detail in U.S. patent application Ser. No. 11/927,234, filed Oct. 29, 2007, and U.S. patent application Ser. No. 11/366,730, filed Mar. 2, 2006, both of which are incorporated herein by reference. Although the illustrative embodiment comprises a beam splitter that is responsive to acoustic energy, it will be clear to one of ordinary skill in the art, after reading this specification, how to make and use alternative embodiments of the present invention wherein a beam splitter is responsive to a different environmental stimulus, such as mechanical energy (e.g., acceleration, vibration, etc.), pressure, thermal energy, nuclear energy, the presence of a chemical, and the like.

Input light 404 is provided by light source 402, which is a laser diode capable of emitting monochromatic light at 850 nanometers (nm) with a spectral-width of less than ten (10) nanometers, and preferably less than three (3) nanometers.

Lens 406 is a plano-convex lens that is suitable for collimating light emitted by a source 402 in well-known fashion. Lens 406 includes access hole 424, which facilitates the propagation of acoustic energy toward beam splitter 408. In some embodiments, lens 406 does not include access hole 424. Lens 406 is aligned to source 402 such that the output of source 402 is received off the central axis of lens 406. Lens 406 collimates the output of source 402 into input light 404 and directs input light 404 toward the focal point of lens 406. Lens 406 also receives reflected signal 410 from beam splitter 408 and focuses the optical energy of reflected signal 410 toward detector 412. The configuration of lens 406, with respect to source 402, beam splitter 408, and detector 412, is often referred to as a "pupil-division" configuration.

In some embodiments of the present invention, lens 406 is not present. In these embodiments, source 402 comprises a collimating lens and a non-orthogonal angle is formed by the direction of propagation of the output of source 402 and beam splitter 408.

Detectors 412 and 416 are photodetectors sensitive to the wavelength of the output light from source 402. Each of detectors 412 and 416 measure the intensity of the light that is incident on it and transmits an electrical signal indicative of that intensity to processor 422. It will be clear to those skilled in the art, after reading this specification, how to make and use detectors 412 and 416. Detector 412 receives reflected signal 410 and detector 416 receives transmitted signal 414.

Processor 422 is a general-purpose processor that is capable of reading data and instructions from a memory, of executing instructions, of writing data to a memory, of receiving data from detectors 412 and 416, and of providing electrical signal 426, which is based on electrical signals 418 and 420. Processor 422 receives electrical signals 418 and 420 and performs signal processing based on those signals. It will be clear to those skilled in the art, after reading this specification, how to make and use processor 422.

FIG. 3B depicts sub-operations suitable for forming a beam splitter as part of optical displacement sensor 400 in accordance with the illustrative embodiment of the present invention.

Figure 5:
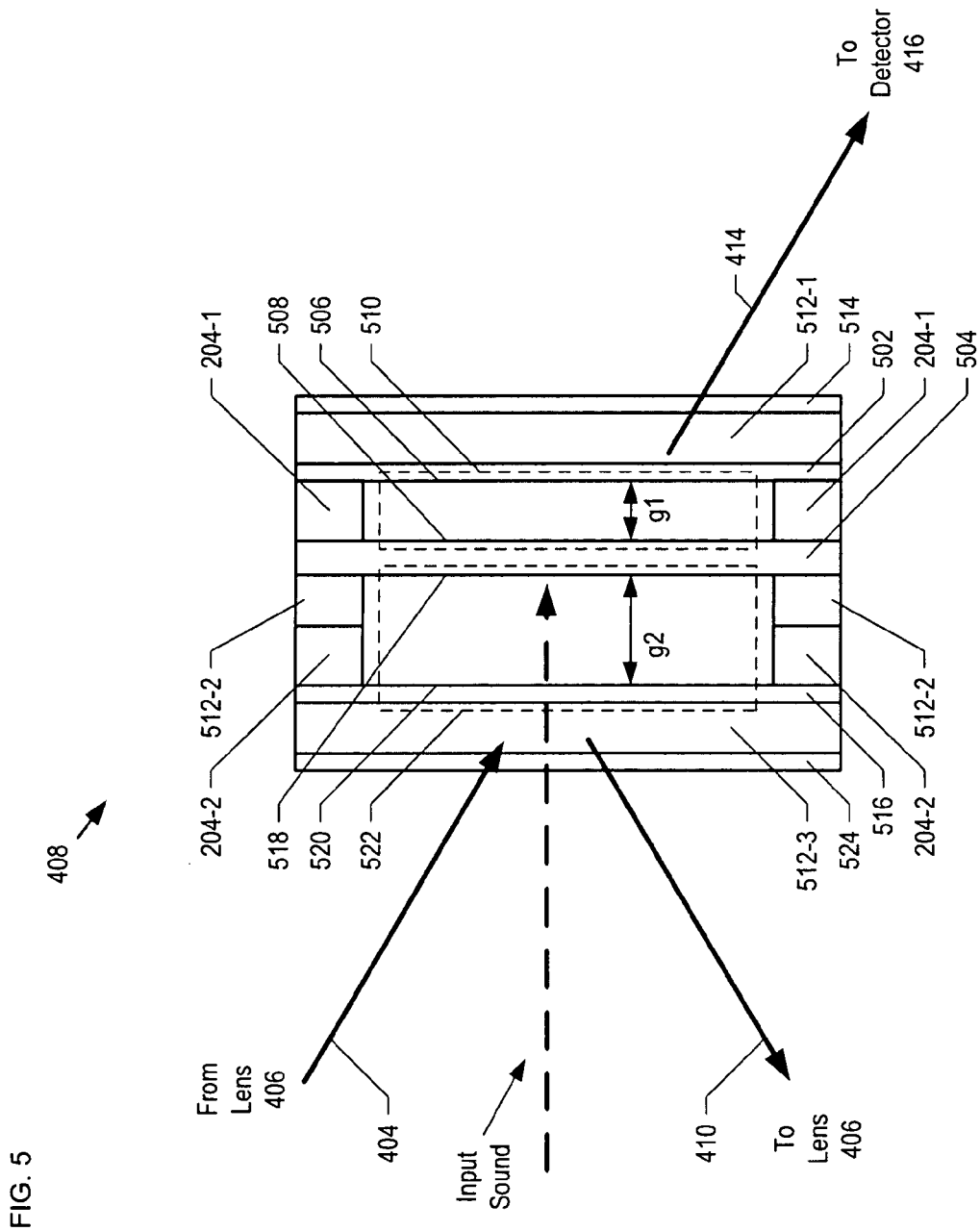
FIG. 5 depicts a cross-sectional diagram of details of a beam splitter as part of optical displacement sensor 400 in accordance with the illustrative embodiment of the present invention.

FIG. 5 depicts a cross-sectional diagram of details of a beam splitter as part of optical displacement sensor 400 in accordance with the illustrative embodiment of the present invention. Beam splitter 408 comprises first optically resonant cavity 510 and second optically resonant cavity 522. Surface 506 of first layer 502 and surface 508 of second layer 504 collectively define first optically resonant cavity 510. In similar fashion, surface 520 of third layer 516 and surface 518 of second layer 504 collectively define second optically resonant cavity 522. Optically resonant cavities 510 and 522 function in cooperative fashion to collectively distribute input light 404 into reflected signal 410 and transmitted signal 414.

Operation 310 begins with sub-operation 306, wherein first layer 502 is provided. First layer 502 is a layer of material that is translucent for a wavelength of light contained in input light 404. First layer 502 is approximately $n*\lambda/4$-thick, where $\lambda$ is the wavelength (within layer 502) of light provided by source 402 and n is an odd-integer. In some embodiments of the present invention, layer 502 comprises layer of silicon-rich silicon nitride (SiRN) having a thickness substantially equal to 100 nanometers (nm). The thickness of layer 502 is determined so as to provide suitable performance of beam splitter 408 for input light 404. It will be appreciated by those skilled in the art that first layer 502 may have other thicknesses and comprise other materials.

First substrate 512-1 is a 500 micron-thick silicon wafer. First substrate 512-1 provides a mechanical platform for layer 502. First substrate 512-1 is substantially transparent for a wavelength of light contained in input light 404. In some embodiments of the present invention, first substrate 512-1 is a material other than silicon. Suitable materials for first substrate 512-1 include, without limitation, glass, III-V compound semiconductors, II-VI compound semiconductors, ceramics, and germanium.

Anti-reflection coating 514 is disposed on the surface of first substrate 512-1 that is distal to second layer 504. It will be clear to those skilled in the art how to make and use anti-reflection coating 514.

At operation 307, first adhesive layer 204-1 is applied to the perimeter of first layer 502. First adhesive layer 204-1 comprises equal volumes of a UV-curable epoxy and spherical spacers having a diameter of approximately 150 microns. The viscosity of adhesive layer 204-1 is selected as gel-like to mitigate problems associated with its flow along first layer 502 during fabrication. Adhesive layer 204-1 is analogous to adhesive layer 204 described above and with respect to FIGS. 1 and 2.

At operation 308, second layer 506 is disposed on first adhesive layer 504. Second layer 506 is a layer of silicon nitride having a thickness substantially equal to 100 nm. Second layer 506 is analogous to first layer 502 and, therefore, can comprise layers having the same thicknesses and the same materials as first layer 502.

Second layer 506 is formed on second substrate 512-2, which has been etched to form a membrane region in the areas of optically resonant cavities 510 and 522. Second substrate 512-2 is a silicon substrate having a thickness substantially equal to 500 microns. Second substrate 512-2 is analogous to first substrate 512-1.

In some embodiments, beam splitter 408 comprises a single optically resonant cavity 510. In these embodiments, operation 301 would not comprise sub-operations 309 and 310, but would instead move directly to sub-operation 311 after sub-operation 308.

At operation 309, second adhesive layer 204-2 is applied to the perimeter of second substrate 512-2. Second adhesive layer 204-2 is analogous to adhesive layer 204 and comprises equal volumes of UV-curable epoxy and spherical spacers that have a diameter substantially equal to 150 microns. Together, substrate 512-2 and adhesive layer 204-2 define gap g2. By virtue of second substrate 512-2 and second adhesive layer 204-2, gaps g2 and g1 are not equal. It will be clear to those skilled in the art, however, after reading this specification, how to make and use embodiments of the present invention wherein gaps g1 and g2 are substantially equal.

In some embodiments, the diameter of the spacers contained in second adhesive layer 204-2 is a different diameter than the diameter of the spacers contained in first adhesive layer 204-1. In some embodiments, the shape of the spacers contained in second adhesive layer 204-2 is different than the shape of the spacers contained in first adhesive layer 204-1.

At operation 310, third layer 516 is disposed on second adhesive layer 204-2. Third layer 516 is a layer of silicon nitride having a thickness substantially equal to 100 nm. Third layer 516 is analogous to first layer 502 and, therefore, can comprise layers within the same thicknesses range and the same materials as first layer 502.

Third layer 516 is formed on third substrate 512-3, which is a silicon substrate having a thickness substantially equal to 500 microns. Third substrate 512-3 is analogous to first substrate 512-1.

Anti-reflection coating 524 is disposed on the surface of third substrate 512-3 that is distal to second layer 504. It will be clear to those skilled in the art how to make and use anti-reflection coating 524.

By virtue of etched substrate 512-2 and a lack of adhesives 204-1 and 204-2 in the regions of optically resonant cavities 510 and 522, second layer 504 comprises a membrane region that is capable of motion in response to an environmental stimulus—specifically acoustic energy contained the input sound. As a result, cavity length g1 of optically resonant cavity 510 and cavity length g2 of optically resonant cavity 522 are a function of the input sound. Typically, second layer 504 comprises through holes to facilitate its motion although, for clarity, these are not shown in FIG. 5.

At operation 311, pressure is applied to the stack of layers to thin first adhesive layer 204-1 and second adhesive layer 204-2 to a single layer of spacers each. As a result, the initial cavity length (i.e., the cavity length in the absence of an environmental stimulus) of optically resonant cavities 510 and 522 are made equal to gap g1 and gap g2, respectively.

At operation 312, first adhesive layer 204-1 and second adhesive layer 204-2 are cured to harden their respective adhesives and constrain their respective spacers.

Figure 6:
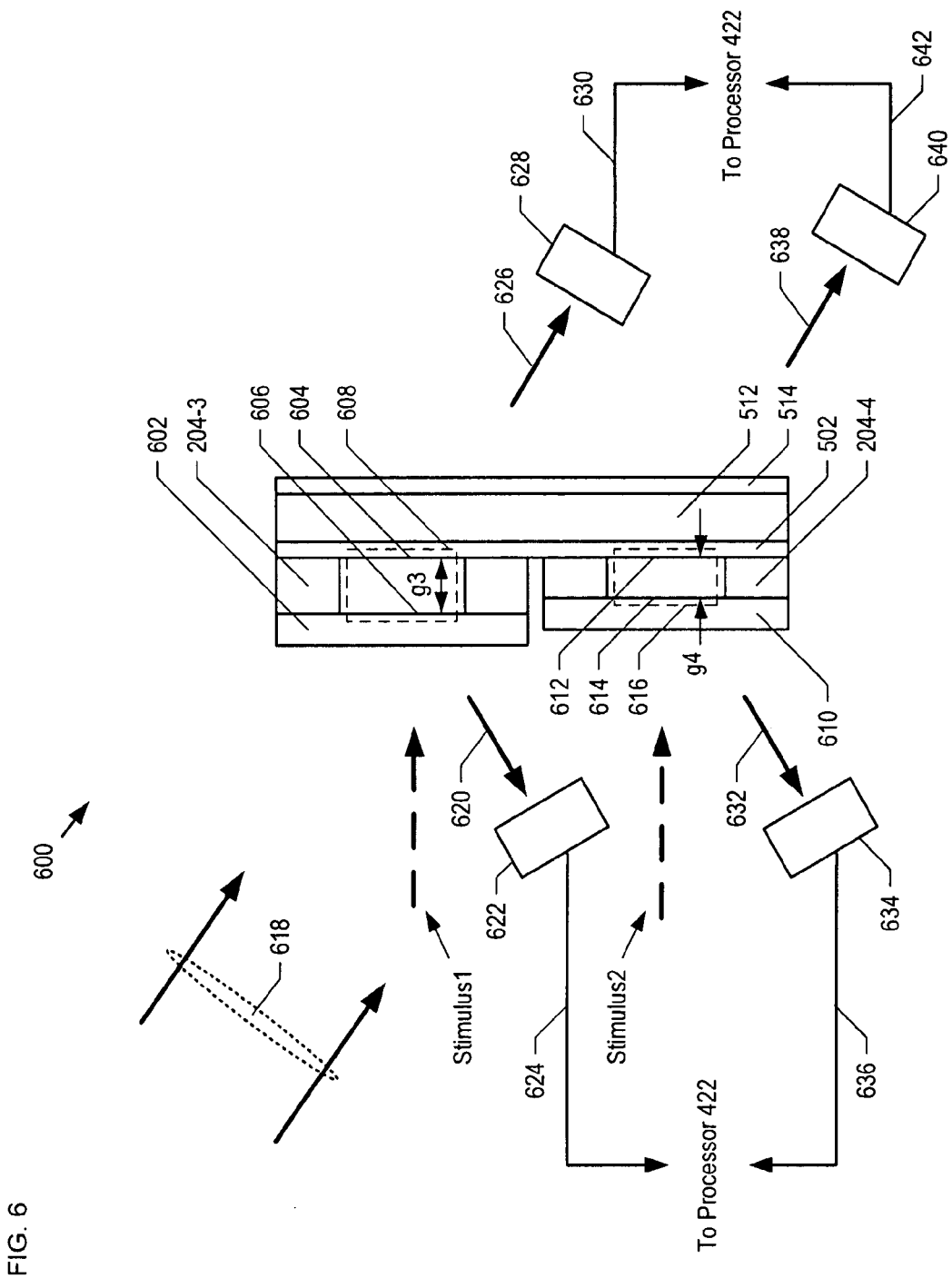
FIG. 6 depicts a cross-sectional diagram of details of a beam splitter in accordance with an alternative embodiment of the present invention.

FIG. 6 depicts a cross-sectional diagram of details of a beam splitter in accordance with an alternative embodiment of the present invention. Beam splitter 600 comprises first optically resonant cavity 608 and second optically resonant cavity 616. Each of first optically resonant cavity 608 and second optically resonant cavity 616 are resonant at a different wavelength. In addition, first optically resonant cavity 608 and second optically resonant cavity 616 are sensitive to different environmental stimuli. In some embodiments, first optically resonant cavity 608 and second optically resonant cavity 616 are resonant at the same wavelength. In some embodiments, first optically resonant cavity 608 and second optically resonant cavity 616 respond to the same environmental stimulus.

Optically resonant cavity 608 is defined by first surface 604 and second surface 606, which are separated by gap g3. The initial cavity length of optically resonant cavity 608, therefore, is equal to gap g3. The instantaneous cavity length of optically resonant cavity 608 is based on environmental stimulus stimulus1.

First surface 604 is a first region of a surface of first layer 502.

Second surface 606 is a surface of second layer 602. Second layer 602 is disposed on first adhesive layer 204-3, which is analogous to adhesive layer 204 described above and with respect to FIGS. 1 and 2. Second layer 602 is analogous to second layer 504 of beam splitter 408, as described above and with respect to FIG. 5. The spacers contained in adhesive layer 204-3 are glass spheres that have a diameter substantially equal to 150 microns. As a result, the initial cavity length of optically resonant cavity 608 is equal to gap g3, which is substantially equal to 150 microns.

Optically resonant cavity 616 is defined by third surface 612 and fourth surface 614, which are separated by gap g4. The initial cavity length of optically resonant cavity 616, therefore, is equal to gap g4. The instantaneous cavity length of optically resonant cavity 616 is based on environmental stimulus stimulus2.

Third surface 612 is a second region of the surface of first layer 502.

Fourth surface 614 is a surface of third layer 610. Third layer 610 is disposed on second adhesive layer 204-4, which is analogous to adhesive layer 204 described above and with respect to FIGS. 1 and 2. Third layer 610 is analogous to second layer 504 of beam splitter 408, as described above and with respect to FIG. 5. The spacers contained in adhesive layer 204-3 are glass spheres that have a diameter substantially equal to 100 microns. As a result, the initial cavity length of optically resonant cavity 608 is equal to gap g4, which is substantially equal to 100 microns.

Input light 618 is a collimated beam of light that contains light characterized by multiple wavelengths, including those for which optically resonant cavities 608 and 616 are optically resonant. The diameter of the beam of input light 618 is sufficient to flood illuminate both optically resonant cavities.

In operation, first optically resonant cavity 608 distributes light characterized by a first wavelength into reflected signal 620 and transmitted signal 626. In similar fashion, second optically resonant cavity 616 distributes light characterized by a second wavelength into reflected signal 632 and transmitted signal 638.

Photodetectors 622, 628, 634, and 640 provide electrical signals 624, 630, 636, and 642, respectively, to processor 422. Electrical signals 624, 630, 636, and 642 are based on the optical energy in reflected signal 620, transmitted signal 626, reflected signal 632, and transmitted signal 638, respectively.

Processor 422 provides an output signal based on some or all of electrical signals 624, 630, 636, and 642.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
providing a first layer comprising a first surface;
providing a second layer comprising a second surface, wherein the second surface is physically adapted to move in response to an environmental stimulus;
securing the first layer and second layer together via an adhesive mixture, wherein the adhesive mixture comprises an adhesive and a plurality of spacers, and wherein each of the plurality of spacers is characterized by a dimension that is substantially equal to a first thickness, and further wherein the secured first surface and second surface collectively define an optically resonant cavity having an initial cavity length substantially equal to the first thickness;
distributing light received by the optically resonant cavity into a reflected signal and a transmitted signal, wherein the light is characterized by a first wavelength, and wherein the ratio of light in the reflected signal and transmitted signal is based on the environmental stimulus; and
producing a first electrical signal based on both (1) the intensity of the reflected signal and (2) the transmitted signal.

2. The method of claim 1 wherein the first electrical signal is based on the difference between the intensities of the reflected signal and the transmitted signal.

3. The method of claim 2 wherein at least one of the second surface is physically adapted to move in response to an acceleration.

4. The method of claim 1 wherein the adhesive is provided such that the plurality of spacers comprises at least one sphere having a diameter substantially equal to the first thickness.

5. The method of claim 1 wherein the adhesive is provided such that the plurality of spacers comprises at least one cylinder having a diameter substantially equal to the first thickness.

6. A method comprising:
forming an optically resonant cavity having an initial cavity length, wherein the optically resonant cavity is formed by securing a first layer comprising a first surface to a second layer comprising a second surface that is physically adapted to move in response to a first environmental stimulus, wherein the first layer is secured to the second layer via an adhesive mixture comprising an adhesive and a plurality of spacers characterized by a dimension that is substantially equal to the initial cavity length;
receiving light at the optically resonant cavity;
distributing the light into a reflected signal and a transmitted signal based on the first environmental stimulus;
producing a first electrical signal based on the intensity of the reflected signal;
producing a second electrical signal based on the intensity of the transmitted signal; and
producing a third electrical signal based on the first electrical signal and the second electrical signal.

7. The method of claim 6 wherein the third electrical signal is based on a difference between the first electrical signal and the second electrical signal.

8. The method of claim 6 wherein the first optically resonant cavity is provided such that the plurality of spacers comprises at least one sphere having a diameter substantially equal to the first thickness.

9. The method of claim 6 wherein the first optically resonant cavity is provided such that the plurality of spacers comprises at least one cylinder having a diameter substantially equal to the first thickness.

10. The method of claim 6 wherein the optically resonant cavity is formed by operations further comprising:
aligning the first layer and the second layer;
disposing the adhesive mixture on at least one of the first layer and the second layer while the adhesive mixture is in an uncured state;
applying pressure to the first layer and the second layer to substantially thin the first adhesive mixture to the first thickness; and
curing the adhesive mixture.

11. The method of claim 6 further comprising:
providing a third layer comprising a third surface;
providing a second adhesive mixture, wherein the second adhesive mixture comprises a second adhesive in an uncured state and a second plurality of spacers, and wherein each of the second plurality of spacers is characterized by a dimension that is substantially equal to a second thickness;
arranging the third layer, second layer, and second adhesive mixture so that the second adhesive mixture is in contact with each of the third layer and the second layer;
securing the third layer and the second layer with the second adhesive mixture so that the third surface and a fourth surface of the second layer define a second optically resonant cavity that has a second initial cavity length, wherein the second initial cavity length is based on the second thickness; and
curing the second adhesive;
wherein at least one of the third surface and the fourth surface is physically adapted to move in response to a second environmental stimulus.

12. The method of claim 11 wherein the second environmental stimulus and the first environmental stimulus are the same environmental stimulus.

13. The method of claim 12 further comprising interposing the second layer between the first layer and the third layer such that each of the second surface and the fourth surface interposes the first surface and the third surface, wherein each of the second surface and the fourth surface is physically adapted to move in response to the first environmental stimulus.

* * * * *